Nov. 29, 1955　　　　J. W. HORNING　　　　2,725,204
PARATROOPER ACCOUTERMENT
Filed June 30, 1953　　　　　　　　　　　　2 Sheets-Sheet 2

INVENTOR.
JAMES W. HORNING
BY
ATTORNEY

United States Patent Office 2,725,204
Patented Nov. 29, 1955

2,725,204

PARATROOPER ACCOUTERMENT

James W. Horning, Carbondale, Pa., assignor to General Textile Mills, Inc., New York, N. Y., a corporation of Delaware Application June 30, 1953, Serial No. 365,211

8 Claims. (Cl. 244—151)

My invention relates to a paratrooper accouterment and more particularly to an improved paratrooper accouterment which is readily adjustable to size and which is simple and safe in operation.

Paratrooper accouterment presently used includes a harness for holding the main parachute and auxiliary parachute to the trooper's body. Each of the leg straps and riser straps of the harness must be individually adjusted to length depending upon the size of the wearer and the uniform worn by an individual wearer. The main parachute is attached to the riser straps of the harness and the riser and leg straps are secured each to the other by means of a quick release mechanism. When the trooper has landed, he must disengage the quick release mechanism in order to free himself from the parachute. In addition, the harness includes a "belly band" which is strapped around the wearer's body and fastened to the pack to hold it securely to the body. An auxiliary parachute is provided which is used by the trooper in the event his main parachute fails to open, and this auxiliary parachute pack is attached to D-clamps fixed to the riser straps. The arrangement is such that the main parachute pack is carried on the trooper's back while the auxiliary parachute pack is carried at his front. In order to gain access to the quick release mechanism, the trooper must first detach the auxiliary parachute from at least one of the D-clamps on the riser straps. This is usually done a short time before he actually lands in order that he may release himself at once upon landing. After the quick release mechanism has been actuated, he must then unbuckle the "belly band" to free himself completely from the parachute and pack structure. In his travel downward, when his weight is supported by the main parachute, the main parachute tends to spread the riser straps. This results in tautening the engagement between the auxiliary pack and the D-clamps to such an extent that it is extremely difficult to detach the auxiliary parachute and gain access to the quick release mechanism. I have invented improved paratrooper accouterment including a harness which is readily adjustable to size and which is provided with means for preventing the riser straps from spreading under the action of the main parachute. In addition, my improved accouterment has means for securely attaching the pack to the wearer's body without the necessity of employing the "belly band." My improved accouterment also is held in position so that when the parachute opens, discomfort and the changes of injury to the wearer occasioned by opening shock are reduced.

One object of my invention is to provide improved paratrooper accouterment which is readily adjustable to size.

Another object of my invention is to provide improved paratrooper accouterment which is simple and safe in operation.

A further object of my invention is to provide improved paratrooper accouterment including a parachute harness which is provided with means for preventing the spread of riser straps under the action of the main parachute when in use.

Other and further objects of my invention will appear from the following description.

In general my invention contemplates the provision of a length of two-ply textile webbing forming a pair of riser straps. This two-ply webbing is stitched at points intermediate its ends to provide a pair of restricted openings adjacent the mid-point of the length. Each of a pair of shoulder straps is attached at one end to a point adjacent one of the ends of said two-ply webbing and has a friction buckle fixed to its other end. One end of each of a pair of lengths of webbing is passed through a respective friction buckle. The other ends of the pair of lengths are passed through respective restricted openings, doubled back upon themselves and fixed to the two-ply webbing at points adjacent their associated openings. The portions of said pair of lengths of webbing between the adjustably secured ends and the openings form back straps and the doubled portions form leg straps. Each of a first pair of loops is fixed on a respective riser strap. I provide a pair of chest straps and a second pair of loops, each of said chest straps and each of said second pair of loops fixed on a respective riser strap. The leg straps are adapted to pass through the first pair of loops and the chest straps through the second pair of loops and means are provided for releasably securing said chest and leg straps each to the other to hold the harness to the wearer's body and prevent the spread of the riser straps under the action of the main parachute. An adjustable pack strap is secured to the riser straps and to the pack to hold the pack to the harness.

In the accompanying drawings which form part of the instant specification and which are to be read in conjunction therewith and in which like reference numerals are used to indicate like parts in the various views.

Figure 1:
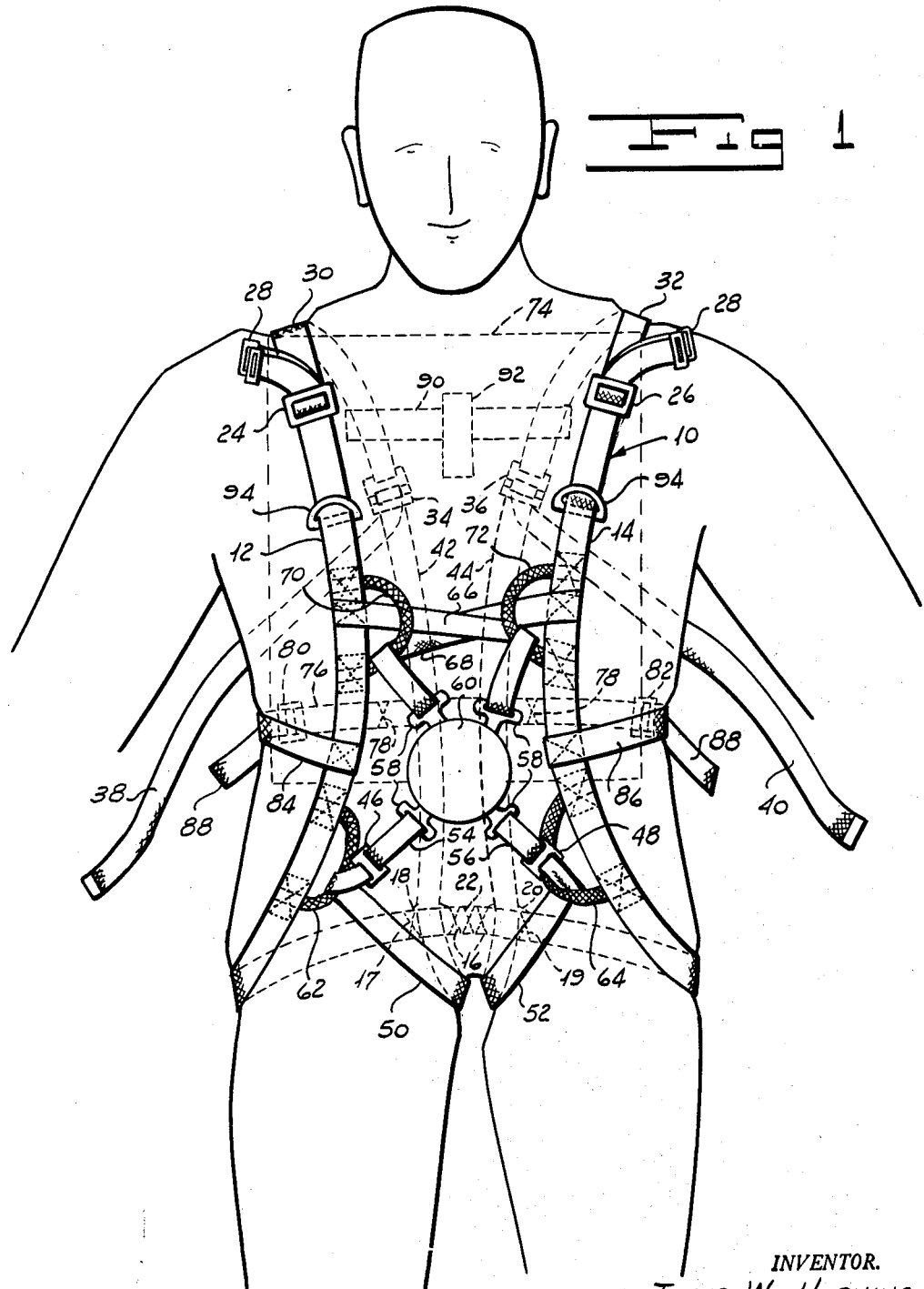
Figure 1 is a front view of my improved paratrooper accouterment when in use.

More particularly, referring now to the drawings, I provide a length of two-ply, or other appropriate, webbing, indicated generally by the reference character 10, which forms a pair of riser straps 12 and 14. The webbing 10 may be of any suitable material but preferably is a soft nylon webbing which is extremely strong, lightweight and comfortable. The length of two-ply webbing 10 is stitched at points along its length, indicated by reference characters 16, 17 and 19, to form a pair of restricted openings 18 and 20 between the plies adjacent the mid-point 22 of the length 10. If a single-ply webbing is used, the openings may be formed by an added strap at this part. Separate lengths of webbing for the riser straps may be employed secured to each other. The ends of the two-ply length 10 pass through a pair of friction buckles 24 and 26 and have clamps 28 secured to the end of each ply for attachment to the main parachute.

A pair of shoulder straps 30 and 32 each have one end fixed, respectively, in one of the buckles 24 and 26 and their other ends looped through friction buckles 34 and 36, doubled back along the length and secured. A pair of lengths of webbing 38 and 40 pass through the adjustable portions of buckles 34 and 36, respectively, and thence downwardly, as viewed in Figure 4, through openings 18 and 20 to form back straps 42 and 44. Lengths 38 and 40 are continued beyond openings 18 and 20 to pass through a pair of buckles 46 and 48 and have their free ends looped back and secured by the stitching 16 to points on length 10 adjacent the openings 18 and 20, respectively, to form adjustable leg straps 50 and 52. Buckles 46 and 48 have short lengths of webbing 54 and 56 fixed thereto, each of which lengths has a fitting 58 thereon for engagement with a quick release mechanism 60.

Figure 4:
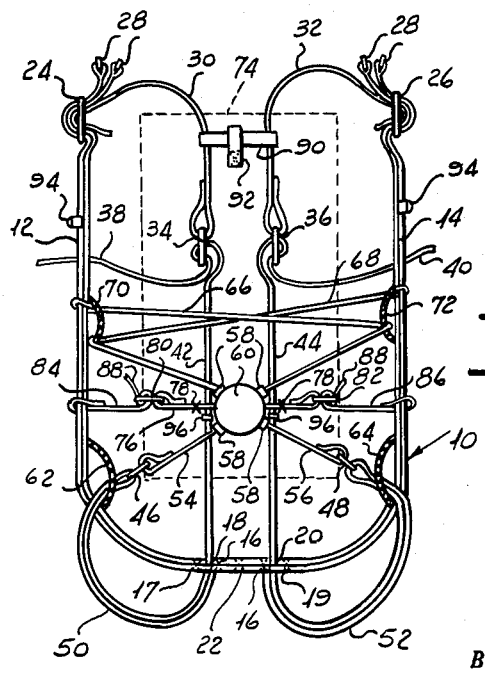
Figure 4 is a schematic view of my improved paratrooper accouterment showing the relative disposition of parts when laid out on a flat surface.

A first pair of loops 62 and 64 are fixed along the length of webbing 10, as shown in Figures 1 and 4. A pair of chest straps 66 and 68 are each fixed at one end to respective riser straps 12 and 14 and have fittings 58 on their other ends for engagement with the quick release mechanism 60. A second pair of loops 70 and 72 are sewed between the plies of risers 12 and 14, respectively, for cooperation with chest straps 68 and 66 when the accouterment is in use.

The main parachute pack is indicated in Figure 4 by broken lines and identified by reference numeral 74. A pack strap 76 is secured to the pack 74 at points indicated by reference character 78. Friction buckles 80 and 82 are attached to the ends of pack strap 76 and are joined, respectively, to risers 12 and 14 by lengths of webbing 84 and 86. Each of the buckles 80 and 82 has a small tape of fabric 88 by means of which the buckles may be pulled to tighten the pack strap. It is to be noted that I pass back straps 42 and 44 between pack strap 76 and the pack 74 inside the stitchings 78 as shown in Figure 4. A short length of tape or webbing 90 is looped about each of the shoulder straps 30 and 32 to prevent them from spreading and is secured to the pack strap by a loop of fabric 92 secured to pack 74.

Figure 2:
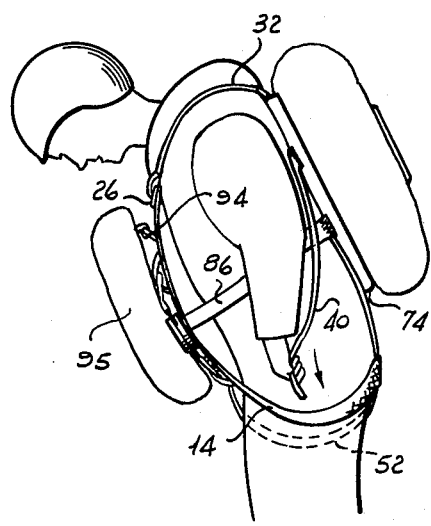
Figure 2 is a side view of my improved paratrooper accouterment in use at a time just prior to making an adjustment and showing the main and auxiliary parachute packs in place.
Figure 3:
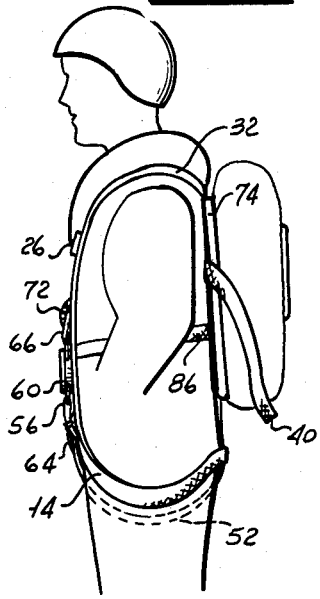
Figure 3 is a side view of my improved paratrooper accouterment when in use after an adjustment has been made, but with the auxiliary parachute pack removed.

Each of the riser straps 12 and 14 has a D-clamp 94 fixed along its length to provide means by which the auxiliary parachute, indicated by the reference character 95 in Figure 2, is attached to the harness. I provide each of the back straps 42 and 44 with a stop 96 for engagement with the pack strap 76 when the back straps are moved upwardly as viewed in Figure 4. It will readily be appreciated that stops 96 may be carried by straps 42 and 44 in a manner to permit adjustment of the position of a stop 96 along its associated strap.

In use, the trooper dons the accouterment by slipping shoulder straps 30 and 32 over his shoulders. Leg straps 50 and 52 are drawn between the legs, passed through loops 62 and 64, respectively, and fixed in the quick release mechanism 60 by means of their fittings 58. He then passes the chest strap 66 on riser strap 12 across his chest and through the loop 72 on the opposite strap 14 and fixes it to the quick release mechanism by its fitting 58. Similarly, he passes chest strap 68 on riser 14 through loop 70 on riser strap 12 and into quick release mechanism 60 by means of its fitting 58.

Prior to donning the accouterment, general adjustments may be made on friction buckles 24 and 26 to vary the length of the riser straps 12 and 14 or the shoulder straps 30 and 32, and on buckles 80 and 82 by means of tapes 88 to change the length of the pack strap 76. It should be appreciated that these adjustments are of a general nature and one adjustment will accommodate a large variety of sizes because of the improved construction of my accouterment.

When the accouterment has been donned, adjustment as to size may be readily and easily accomplished. The wearer first bends forward to the position shown in Figure 2 to permit riser straps 12 and 14 to slacken. He then grasps the ends of the lengths of webbing 38 and 40 and pulls them downwardly in the direction of the arrow in Figure 2. This downward pull results in an upward pull on back straps 42 and 44 which shortens the over-all length of leg straps 50 and 52 by pulling through the openings 18 and 20 and the buckles 46 and 48 to the points at which the ends of lengths 38 and 40 are secured to the length 10 by stitchings 16. As a result of this operation, the amount of webbing in leg straps 50 and 52 will be decreased, the lengths of back straps 42 and 44 will remain the same and the excess will appear at the free ends of lengths 38 and 40. Thus the accouterment is readily and easily adjusted within a wide range of sizes by a single adjustment.

The forces exerted by the main parachute on the riser straps 12 and 14 through the fixtures 28 tend to spread the risers. As will be clear from an examination of Figure 1, this tendency of the risers to spread is resisted by chest straps 66 and 68. These straps 66 and 68 hold the riser straps 12 and 14 together through the medium of loops 72 and 70, respectively. Since the riser straps cannot spread, the distance between D-clamps 94 on respective riser straps will not be increased and there will be no excessive tension on the means securing the riser straps to the D-clamps 94. Therefore, the trooper may easily unclip his auxiliary parachute pack before landing and gain access to quick release mechanism 60 to disengage the accouterment.

Thus it will be seen that I have accomplished the objects of my invention in providing a paratrooper accouterment which is readily adjustable as to size and simple and safe in operation. I have provided means for preventing the spread of harness riser straps under the action of the main parachute and eliminated the necessity for employing a "belly band." My paratrooper accouterment also is held in position on the wearer so that discomfort and the chance of injury on opening shock are reduced.

It will be understood that certain features and subcombinations are of utility and may be employed without reference to other features and subcombinations. This is contemplated by and is within the scope of my claims. It is further obvious that various changes may be made within the scope of my claims without departing from the spirit of my invention. It is therefore to be understood that my invention is not to be limited to the specific details shown and described.

Having thus described my invention, what I claim is:

1. Paratrooper accouterment including in combination a pair of riser straps, means for joining said riser straps at one end, said means providing a pair of restricted openings, a pair of shoulder straps, each adjustably attached at one end to the other end of a respective riser strap and having an adjustable fastening means at its other end, a pair of lengths of webbing, one end of each of said lengths passing through a respective adjustable fastening means, the other end of each of said lengths passing through a respective one of said openings to form a back strap and being doubled back and fixed to said means for joining the riser straps, the doubled portion of each of said lengths forming a leg strap, a first pair of loops each fixed on a respective riser strap, a pair of chest straps and a second pair of loops, each of said chest straps and each of said second pair of loops fixed on a respective riser strap, each leg strap adapted to pass through the loop of the first pair of loops which is on the corresponding riser strap, each chest strap adapted to pass through the loop of the second pair of loops on the opposite riser strap and means for releasably securing said chest straps and said leg straps one to the other.

2. Paratrooper accouterment as in claim 1 including a main parachute pack, a pack strap secured to said pack at points along its length and adjustable means for attaching said pack strap to said riser straps, the arrangement being such that said back straps pass through the opening formed between the pack and the pack strap between the points at which the pack strap is secured to the pack.

3. Paratrooper accouterment as in claim 1 including a main parachute pack, a pack strap secured to said pack at points along its length to form an opening between the pack and the pack strap, the arrangement being such that said back straps pass through said opening, and stop means on the respective back straps to limit the upward movement of the back straps when the accouterment is being adjusted.

4. Paratrooper accouterment as in claim 1 including a crosspiece formed with loops as its ends, each of said shoulder straps passing through one of the loops, respectively, to prevent the spread of the shoulder straps when the accouterment is in use.

5. Paratrooper accouterment as in claim 1 including adjustable means associated with each of said leg straps, respectively, for connecting the leg straps to the releasable securing means.

6. Paratrooper accouterment including in combination a length of two-ply webbing forming a pair of riser straps, said webbing being stitched at points along its length to provide a pair of restricted openings, a pair of shoulder straps each adjustably attached at one end to an end of said length of two-ply webbing and having a friction buckle at its other end, a pair of lengths of webbing, one end of each of said pair of lengths passing through a respective friction buckle, the other end of each of said pair of lengths passing through a respective one of said openings and being doubled back and fixed to said two-ply webbing adjacent its associated opening, the portion of each of said pair of lengths between the adjustably secured end and the associated opening forming a back strap and the doubled portion of each of said pair of lengths forming a leg strap, a first pair of loops each fixed on a respective riser strap, a pair of chest straps and a second pair of loops, each of said chest straps and each of said second pair of loops fixed on a respective riser strap, each leg strap adapted to pass through the loop of the first pair of loops which is on the corresponding riser strap, each chest strap adapted to pass through the loop of the second pair of loops on the opposite riser strap and means for releasably securing said chest straps and said leg straps one to the other.

7. Paratrooper accouterment as in claim 6 including a pair of friction buckles providing adjustable connections between each end of said two-ply webbing and respective ones of said shoulder straps.

8. Paratrooper accouterment for holding a main and an auxiliary parachute to a trooper's body including in combination a pair of riser straps, a pair of leg straps, means comprising a pair of back straps for connecting the respective riser straps to said leg straps, a pair of chest straps, releasable securing means for fastening said leg and chest straps one to the other and means on said riser straps in engagement with said chest straps for preventing the spread of said riser straps under the action of the main parachute during descent.

References Cited in the file of this patent

UNITED STATES PATENTS 2,542,925    Irvin _____ Feb. 20, 1951

FOREIGN PATENTS 968,402    France _____ Apr. 19, 1950